March 31, 1953

C. W. ZIMMERMAN 2,633,484

CALIBRATION OF LOGGING SYSTEMS

Filed July 30, 1951

CARL W. ZIMMERMAN
INVENTOR.

BY D. Carl Richards
AGENT

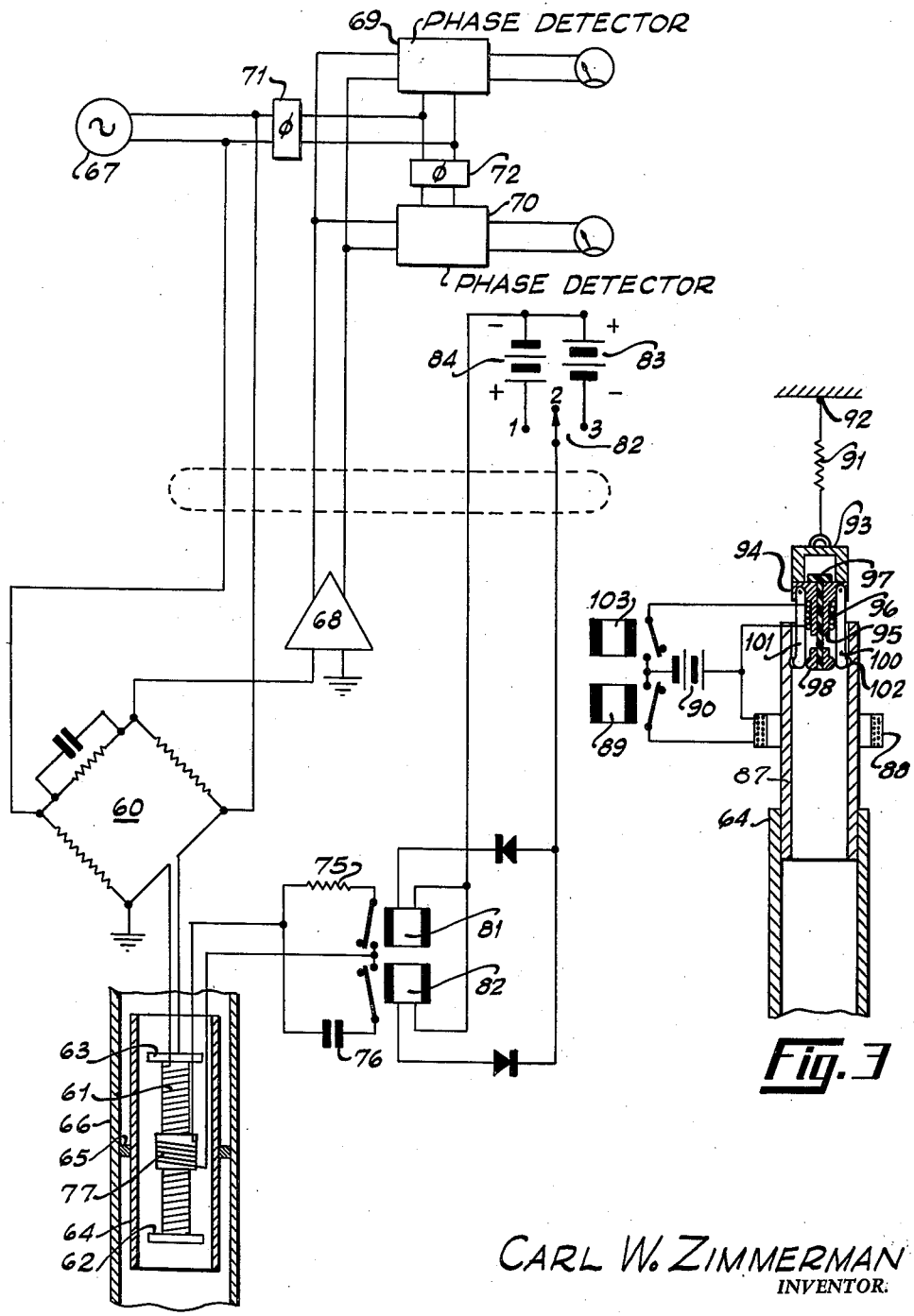

Patented Mar. 31, 1953

2,633,484

UNITED STATES PATENT OFFICE 2,633,484

CALIBRATION OF LOGGING SYSTEMS

Carl W. Zimmerman, Dallas, Tex., assignor, by mesne assignments, to Socony-Vacuum Oil Company, Incorporated, New York, N. Y., a corporation of New York Application July 30, 1951, Serial No. 239,371

14 Claims. (Cl. 175—182)

1

This invention relates to the calibration of logging systems in which investigations of the character of, or conditions in, formations adjacent a well bore proceed through the application of constant frequency sinusoidally varying forces.

In well logging systems characterized by the production of an electrical signal having two components respectively dependent upon different qualities of the formations adjacent a well bore or conditions in the formations, a problem is initially to adjust the system so that the two effects or components may be properly separated.

For example, in induction logging systems of the type illustrated by the patent to Broding No. 2,535,666, formations adjacent the well bore are electromagnetically coupled to a coil system and the resultant signal is phase detected for the production of two components, a first dependent upon conductivity of the formations and a second dependent upon the magnetic susceptibility of the formations. While it is desirable to make all initial adjustments before the exploring sonde is lowered into the bore hole, the presence of large amounts of magnetic materials in structures at the well head is so disturbing that such calibration may not be made. The calibration must therefore be made either at a remote point before the instrument is lowered into the well bore or some means must be provided for control of the necessary adjustments after the instrument is lowered to a depth beyond the influence of the otherwise disturbing magnetic bodies.

Similarly, in acoustic logging systems of the type generically illustrated by the patent to Kean No. 2,530,971, a signal is produced dependent upon the acoustic impedance of formations. Such a signal may be separated by phase detecting means into two components which correspond with acoustic resistance and reactance of the formations. For proper separation of the signal into two components a calibration or initial adjustment problem is present.

In still a third type logging system, such as illustrated by applicant's copending application, Serial No. 189,818 entitled "A Dielectric Well Logging System," a similar problem is present.

It is an object of the present invention to provide a system for readily calibrating logging systems of the type utilizing a formation-dependent signal separable into two components each independently related to distinct characteristics of the formation.

In a preferred form of the invention calibration means is provided for a system having a formation exploring element movably positioned in a well

2 bore and energized from an alternating current source to produce a formation-dependent signal for application to a first of a pair of input circuits of a phase detecting network. An impedance having a dominant characteristic equivalent to a selected property of said formation is coupled to the formation exploring element by means including circuit completing means at the surface of the earth to produce an added signal component at the first input circuit identical in character to the component produced by said selected property; and a circuit is provided for transmitting from the source to the second of the input circuits a reference voltage in phase-coincidence with the added signal component.

For a more complete understanding of the present invention and for further objects and advantages thereof, reference may now be had to the following description taken in conjunction with the accompanying drawings in which:

Fig. 2 illustrates calibration of an acoustic logging system; and

Fig. 3 is a modification of the system of Fig. 2.

Figure 1:
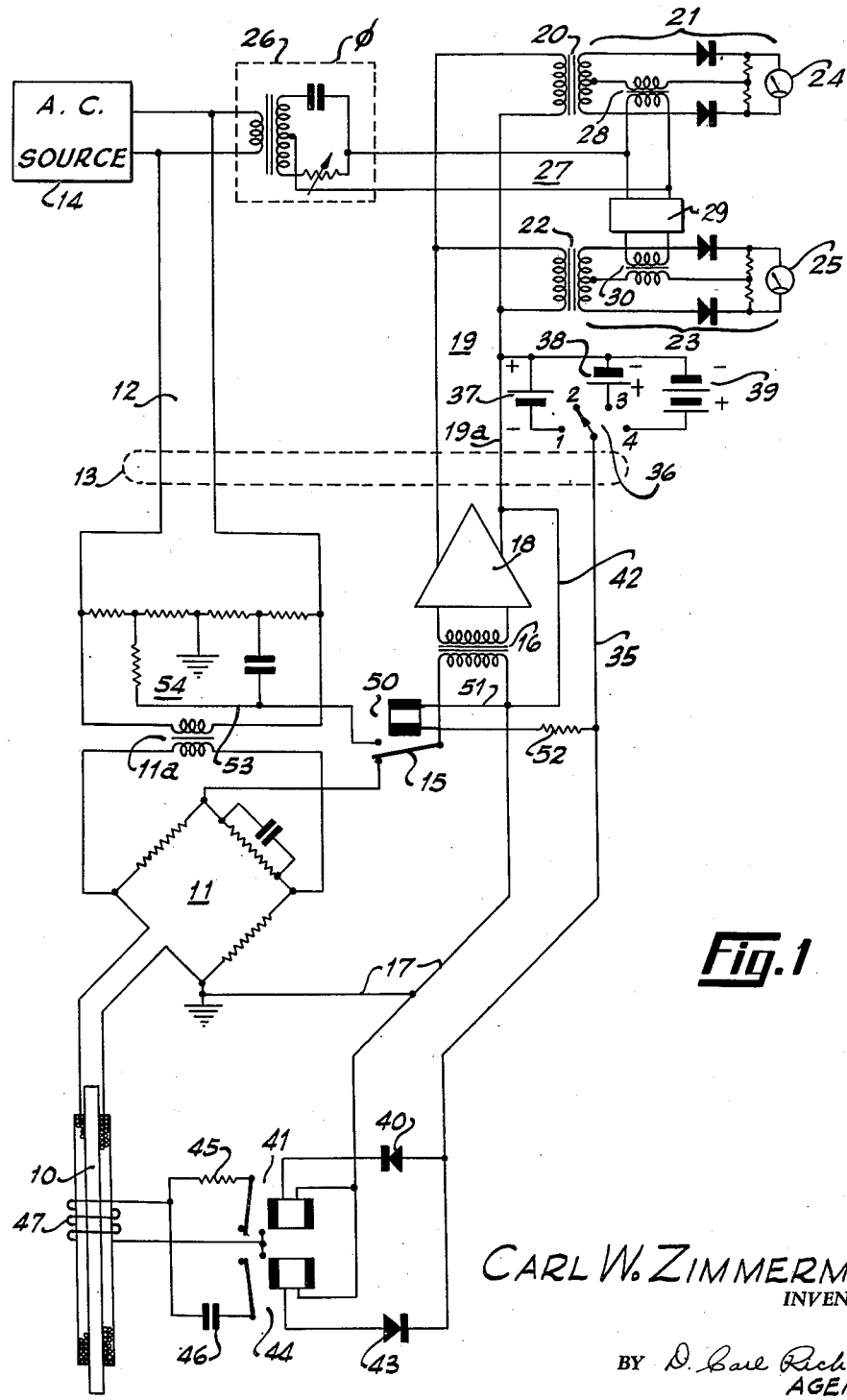
Fig. 1 illustrates calibration of an induction logging system.

Referring now to Fig. 1, there is illustrated a formation exploring element 10 comprising an elongated solenoid forming one arm of a Maxwell bridge network 11. The bridge network 11 is excited through transformer 11a and, by way of a circuit 12 forming a part of a cable 13, from a power source 14 at the surface of the earth. The elements below the dotted loop, representing the outline of cable 13, are to be mounted in a suitable housing, not shown, and movably positioned in a well bore in the manner generally indicated in Patent No. 2,535,666 to Robert A. Broding.

The vertical or output diagonal of the bridge 11 is connected through a relay arm 15 to one terminal of transformer 16 and by way of conductors 17 to the second terminal of transformer 16. The bridge output signal may thereby be transmitted to an amplifier 18. The amplifier output circuit 19 extends from the exploring unit to the surface of the earth and is connected by way of transformer 20 to one input circuit of phase detecting network 21. The circuit 19 is also connected by way of transformer 22 to one input circuit of a second phase detecting network 23. The phase detecting networks 21 and 23 have associated therewith output indicating devices generically represented by meters 24 and 25. The output of the alternating current source 14 is also connected to the phase detecting networks 21 and 23 by way of a phase adjusting circuit 26. The output of phase adjusting network 26 is connected by way of circuit 27 to a second input circuit at transformer 28 in network 21 to apply a reference signal thereto. Through a second phase adjusting network 29, a reference signal is applied to a transformer 30 at a second input circuit of a network 23.

In operation, the bridge network 11 and its formation exploring element 10 are lowered to the bottom of a bore hole. The phase of the reference signal applied by way of channel 27 to transformer 28 is adjusted as to be 90° out of phase with the reference signal applied by circuit 29 to the transformer 30. If the phase of the output of circuit 26 is then properly adjusted with respect to the bridge exciting signal on channel 12, meter 24 will indicate variations in the electrical conductivity of formations or media adjacent the formation coupling 10 independently of magnetic susceptibility and the meter 25 will indicate the magnetic susceptibility of formations independently of electrical conductivity.

By applicant's invention, the formation exploring element 10 at the bottom of a bore hole and remote from iron masses may be calibrated by adjusting the phase angle between the signals on channels 12 and 27 for optimum operation.

More particularly, applicant provides a switching circuit including conductor 35 in cable 13 which extends into the bore hole from the surface. At the surface of the earth conductor 35 is connected to the movable arm of a multi-terminal switch 36. A battery 37 having its negative terminal connected to the first switch contact is connected at its positive terminal to conductor 19a which extends into the bore hole. The second terminal of switch 36 is open-circuited. The third terminal is connected to the positive pole of a battery 38. The negative terminal thereof is connected to conductor 19a. The fourth terminal of switch 36 is connected to the positive terminal of a battery 39 whose negative terminal is connected to conductor 19a.

Adjacent the exploring element 10, the conductor 35 is connected through a first rectifier 40 and the coil of a relay 41 to conductor 17. Conductor 17 is connected by way of conductor 42 to conductor 19a to complete a conductive circuit to switch 36. Conductor 35 is also connected by way of a second rectifier 43 and the coil of a second relay 44 to conductor 17.

By actuation of relays 41 or 44, a resistor 45 or a condenser 46 selectively may be coupled to the formation exploring element 10. The resistor 45 is connected between the armature of relay 41 and one terminal of a coil 47. The coil 47 is wound around or inductively linked to the solenoid 10. The other terminal of coil 47 is connected to the normally open contact of relay 41. Similarly, condenser 46 is connected between the armature of relay 44 and the first terminal of the coil 47. A third relay 50 is connected by way of conductor 51 to conductor 17 and by way of resistor 52 to conductor 35. The normally open terminal of the relay 50 is connected by way of conductor 53 to a resistor-capacitor circuit 54 which is connected across circuit 12.

The individual impedances in circuit 54 are selected so that the signal between conductor 53 and ground has the same character both in amplitude and phase as the signal from the bridge 11 when the coil 10 is in air and remote from any inductive or low resistive bodies. Resistor 45 preferably is non-inductive and condenser 46 preferably has infinite resistance.

In actual calibration procedure the switch 36 may be placed in its first circuit completing position whereby the voltage from battery 37 appears between conductors 17 and 35. In the second position of switch 36 the bridge unbalance signal, separated into two components of generally unknown phase relation appears on meters 24 and 25. The voltage on channel 17–35 in switch position 1 is insufficient to actuate relay 50 but, by producing flow of current through rectifier 43, actuates relay 44. Relay 41 is not affected because it is isolated by the rectifier 40. When relay 44 is energized, condenser 46 is connected in circuit with the coupling coil 47 to introduce in the bridge network 11 an added unbalance effect identical in nature with that produced by a change in susceptibility of the media adjacent thereto. Stated otherwise, a component is added to the unbalance signal from bridge 11 by reason of the presence of condenser 46 in the coupled circuit that has the same phase relation as the component present by reason of the fact that the formation has a magnetic susceptibility different than that of air. The variable phase circuit 26 is then adjusted so that, for repeated actuation of switch 36 from position 1 to position 2, meter 24 senses no change. This condition is established when the phase angle between the reference signal applied to transformer 28 is in phase-quadrature with the component of the signal applied to transformer 20 that is due to the presence of condenser 46 in the coupled circuit and is in phase-coincidence (in-phase or 180° out-of-phase) with the component of bridge unbalance signal due to conductivity of formations. Regardless of the character of the formation adjacent the solenoid 10 and the consequent initial bridge unbalance, the addition of the condenser increases but one of the two components of the bridge unbalance, giving a reliable guide for proper adjustment of the phase shifting circuit 26.

In a similar manner when the switch 36 is in position 3, current flows through rectifier 40 and the coil is relay 41 thereby connecting the resistor 45 in circuit with coil 47. If the phase adjusting circuit 26 was properly set during the previously described operation, meter 24 will sense the presence or absence of resistor 45. The phase adjusting circuit 29, identical with that of circuit 26, is then adjusted so that meter 25 senses no change upon the insertion of the resistor 45. If the switch is then moved to position 4, there is applied to conductors 17 and 35 the voltage of the battery 37. Battery 37 is preferably of sufficient voltage to actuate the relay 50, thereby connecting amplifier 18 to network 54. A signal then appears on channel 19 that is the same as introduced when the solenoid is in air; i. e., in a region of zero susceptibility and zero conductivity. A two trace chart recorder (not shown), but in circuit with or substituted for meters 24 and 25, may be adjusted to zero for each trace at the beginning of the logging run.

Thus, in accordance with the present invention, there is provided in a system having a formation exploring element for producing a signal proportional to two quantities for application to phase detecting networks, a resistance and a capacitance, which by means remotely energized, are selectively coupled to the formation exploring device. Phase adjusting means are provided in circuit with the phase detectors for producing at one of the phase detectors an effect dependent entirely upon the resistor and independent of the condenser and for producing at the second of the phase detectors an effect entirely dependent upon the condenser and independent of the resistor.

The formation exploring element 10 and bridge 11 may then be withdrawn from the bottom of the bore hole to produce in accordance with conventional techniques a log which portrays variations in either or both of the unbalance components as a function of bore hole depth.

A system for calibrating an acoustic well logging device of the type generically illustrated by the patent to Kean, 2,530,971, based upon vibration of a magnetostrictive cylinder, is illustrated in Fig. 2. The Maxwell bridge 60 includes in one arm a coil 61 wound on a core having end pieces 62 and 63. The coil 61 is disposed coaxially of, and inside a nickel tube 64 which is rigidly mounted at its center by the clamping ring 65 supported by an outer case 66. Excitation of the bridge 60 from the source 67 at the surface of the earth produces alternating magnetic flux in the nickel tube 64 which, because of its magnetostrictive properties, causes it to vibrate, thus generating acoustic energy which travels to the formations. It has been shown that although the nickel tube vibrates longitudinally, its radiation is principally radial. Variations in the properties of the earth formations adjacent the nickel tube are reflected as impedance changes in the coil 61, which changes produce a formation-dependent bridge unbalance signal. The latter signal is transmitted by way of amplifier 68 to surface phase detectors 69 and 70 of the type discussed in connection with Fig. 1.

In order to calibrate this system for determination of the proper adjustment of the phase determining networks 71 and 72, applicant provides a surface controlled relay system for coupling in the bore hole resistor 75 or condenser 76 to the coil 61. More particularly, a second winding 77 is disposed in inductive coupling relation to the coil 61 and is connected at one terminal to the open circuit contacts of relays 80 and 81. The other terminal of coil 77 is connected by way of resistor 75 to the armature of relay 81 and connected by way of condenser 76 to the armature of relay 80. A switch 82 at the surface of the earth may be actuated selectively to include battery 83 in circuit with the relays 80 and 81 selectively to actuate the relays for inclusion of the desired impedances (75 or 76) in circuit with the coil 77. The resistor 75 produces an unbalance, or an added component to the bridge unbalance, of the same character as produced by the acoustic dissipative properties of the formation while the condenser introduces a component of the same nature as the components produced by the reactive or phase shift component of the bridge unbalance.

In Fig. 3 there is illustrated a system for adding to the vibrating nickel rod 64, one end of which is shown, mechanical lumped impedances that produce effects of the same nature as produced by the electrical impedances 75 and 76 of Fig. 2. In both cases the impedances coupled to the vibrating system produce effects that are equivalent to a selected property of the formation. Referring to Fig. 3 a copper tube 87 is rigidly fastened to the end of the nickel tube 64 and vibrates therewith. A coil 88 encircles the copper tube at a mid-point. One terminal of the coil 88 is connected to the armature of the relay 89. The normally open circuit terminal of relay 89 is connected by way of battery 90 to the other terminal of the coil 88. Upon actuation of relay 89 current flows from battery 90 through the coil 88 to establish a magnetic field, the flux lines of which pass through portions of the copper tube in which resulting eddy currents react with the magnetic field to damp the vibratory motion of the tube 64. Since electrical energy is dissipated as heat in the copper tube, the electromagnetic damping effect produces an added component to the bridge unbalance signal that is of the same character as is produced by the energy dissipating of the formations.

In similar manner, there is provided means for attaching to the vibrating system an added mass which produces a component of the same character as produced by the phase shift properties of the formations. More particularly, a spring 91 supports the mass from the case (not shown) at a point generically indicated by the connection 92. The mass includes a yoke 93 which supports a disk 94. The disk supports or is integral with a core 95 around which is disposed a winding 96. A non-magnetic rod 97 extends through the disk 94 and is mechanically coupled to an armature 98. The rod 97 extends through the core 95 and the disc 94 and has a weight supporting head which rests upon disc 94 when coil 96 is not energized. Latching bars, two of which, the bars 100 and 101 are shown in Fig. 3, are pivotally supported from the disc 94 and extend vertically into the end of the copper tube 87. The latching bars 100 and 101 have internal sloping cam faces for cooperation with adjacent cam faces of the armature 98. The latching bars also have protruding ends which are normally positioned adjacent an annular groove 102 milled inside the copper tube. Upon energization of the coil 96, the armature 97 is drawn up urging the bars 100 and 101 outward into engagement with the groove 102 in the copper tube whereupon the mass supported by spring 91 vibrates as a unit with tube 64. This produces a change in the mass-spring constant of the nickel cylinder and thus produces a component of bridge unbalance signal of the same character as the equivalent property of the formation. Coil 96 is energized by actuation of relay 103 in a manner similar to that above described in connection with Figs. 1 and 2.

Thus, it will be seen that in alternating current systems having phase separable signals, lumped impedances may be coupled, mechanically or electrically as appropriate, to a formation exploring element to introduce into the formation-dependent signal an added component that is equivalent to a selected property of the formation under investigation and is independent of other properties. The added component then gives an operator a reliable basis for making initial adjustments prior to procuring a log of variations in such properties of the formations as a function of bore hole depth.

It should be observed that in order to introduce added signals that are dominately dependent upon but one property in the system of Fig. 1, it is necessary to utilize cores for the formation exploring element that are of high quality magnetic materials. In the system of Fig. 1 the core was formed of laminations 0.005" thick of a high quality magnetic alloy comprised of approximately equal portions of iron and nickel plus relatively small amounts of manganese and silica, known in the art under the familiar trade name "Conpernik." By using such high quality core material, the impedance of the coil was substantially entirely reactive, the phase angle between voltage and current being approximately 89°. Approximately 400 turns of #16 gauge wire formed the exploring coil. A secondary coil (coil 47, Fig. 1) of 30 turns of #20 gauge wire in conjunction with a resistor 45 of 3300 ohms or a condenser 46 of 0.13 microfarad introduced an added bridge unbalance signal component of sufficient magnitude to permit accurate adjustment of the phase angle by circuits 26 and 29. The system of Fig. 2 may be calibrated by observing the same considerations as above set out for the system of Fig. 1.

The construction of the elements of the system of Fig. 3 may be determined from principles of vibrating bodies well known and understood by those skilled in the art. It is to be noted that a modifying system was shown for one end of the tube in Fig. 3 only. It is to be understood that such a system may be provided for both ends of the tube.

While particular embodiments of the invention have been illustrated and described, it is to be understood that further modifications may now suggest themselves to those skilled in the art, and it is intended to cover such modifications as fall within the scope of the appended claims.

What is claimed is:

1. In a system having a formation exploring element energized from an alternating current source and movably positioned in a well bore to produce a formation-dependent signal for application to a first of a pair of input circuits of a phase detecting network, the combination which comprises an impedance having a dominant characteristic equivalent to a selected property of said formation, means including circuit completing means at the surface of the earth for coupling said impedance to said exploring element to produce an added component to said formation-dependent signal identical in character with the component of said formation-dependent signal produced by said selected property, and a circuit for transmitting from said source to the second of said input circuits a reference voltage in phase-coincidence with said added signal component.

2. In a system having a formation exploring element energized from an alternating current source and movably positioned in a well bore to produce a formation-dependent signal for application to a first of a pair of input circuits of a phase detecting network, the combination which comprises an electrical impedance having a dominant characteristic equivalent to a selected property of said formation, means including circuit completing means at the surface of the earth for inductively coupling said impedance to said exploring element to produce an added component to said formation-dependent signal identical in character with the component of said formation-dependent signal produced by said selected property, and a circuit for transmitting from said source to the second of said input circuits a reference voltage in phase-coincidence with said added signal component.

3. In a system having a formation exploring element energized from an alternating current source and movably positioned in a well bore to produce a formation-dependent signal for application to a first of a pair of input circuits of a phase detecting network, the combination which comprises a mechanical impedance having a dominant characteristic equivalent to a selected property of said formation, means including circuit completing means at the surface of the earth for mechanically coupling said impedance to said exploring element to produce an added component to said formation-dependent signal identical in character with the component of said formation-dependent signal produced by said selected property, and a circuit for transmitting from said source to the second of said input circuits a reference voltage in phase coincident with said added signal component.

4. In a system having a formation exploring element energized from an alternating current source and movably positioned in a well bore to produce a formation-dependent signal for application to the signal input circuits of each of a pair of phase detecting networks, the combination which comprises a first impedance having a dominant characteristic equivalent to a first selected property of said formation and a second impedance having a dominant characteristic equivalent to an independent selected property of said formation, a circuit including switching means at the surface of the earth to couple in a first position said first impedance to said formation exploring element to produce a first component of bridge unbalance signal of the same character as produced by said first selected property and to couple in said second circuit completing position said second impedance to said formation exploring element to produce a second component of bridge unbalance signal of the same character as produced by said independent selected property, a circuit interconnecting said source and reference signal input circuits of both of said detecting networks for applying to a first of said networks a reference signal in phase coincidence with said first component of bridge unbalance signal and for applying to the second of said networks a reference signal in phase coincidence with said second component of bridge unbalance signal.

5. In a system having a formation exploring element energized from an alternating current source and movably positioned in a well bore to produce a formation-dependent signal for application to the signal input circuits of each of a pair of phase detecting networks, the combination which comprises a first electrical impedance having a dominant characteristic equivalent to a first selected property of said formation and a second electrical impedance having a dominant characteristic equivalent to an independent selected property of said formation, a circuit including switching means at the surface of the earth to couple in a first position said first electrical impedance to said formation exploring element to produce a first component of bridge unbalance signal of the same character as produced by said first selected property and to couple in said second circuit completing position said second electrical impedance to said formation exploring element to produce a second component of bridge unbalance signal of the same character as produced by said independent selected property, a circuit interconnecting said source and reference signal input circuits of both of said detecting networks for applying to a first of said networks a reference signal in phase coincidence with said first component of bridge unbalance signal and for applying to the second of said networks a reference signal in phase coincidence with said second component of bridge unbalance signal.

6. In a system having an acoustic formation exploring element energized from an alternating current source and movably positioned in a well bore to produce a formation-dependent signal for application to the signal input circuits of each to a pair of phase detecting networks, the combination which comprises a first mechanical impedance having a dominant characteristic equivalent to a first selected property of said formation and a second mechanical impedance having a dominant characteristic equivalent to a different selected property of said formation, a circuit including a switching means at the surface of the earth to couple in a first position said first mechanical impedance to said formation exploring element to produce a first component of bridge unbalance signal of the same character as produced by said first selected property and to couple in said second completing position said second mechanical impedance to said second formation exploring element to produce a second component of bridge unbalance signal of the same character as produced by said different selected property, and a circuit interconnecting said source and reference signal input circuits of both of said detecting networks for applying to a first of said networks a reference signal in phase-coincidence with said first component of bridge unbalance signal and for applying to the second of said networks a reference signal in phase-coincidence with said second component of bridge unbalance signal.

7. The combination with a bridge network including a solenoid movably positioned in a well bore and forming one bridge arm coupled to the formations and interconnected by cable means to a surface phase detecting system to which the bridge unbalance signal is applied, of a coil inductively coupled to said solenoid, a resistance and a switch in series circuit with said coil, relay means for controlling said switch, a source of potential, means at the surface for connecting through said cable means said source to said relay to close said switch and introduce into said bridge network an added unbalance signal component of the same nature as produced by the conductivity of said formations, and means for applying to said phase detecting system a reference voltage in phase-coincidence with said added unbalance signal component.

8. The combination with a bridge network including a solenoid movably positioned in a well bore and forming one bridge arm coupled to the formations and interconnected by cable means to a surface phase detecting system to which a bridge unbalance signal is applied, of a coil inductively coupled to said solenoid, a condenser and a switch in series circuit with said coil, relay means for controlling said switch, a source of potential, means at the surface of the earth for connecting through said cable means said source to said relay to close said switch and introduce to said bridge network an added unbalance signal component of the same nature as produced by the susceptibility of the formations, and means for applying to said phase detecting system a reference voltage in phase-coincidence with said added unbalance signal component.

9. Calibration means for logging systems having a formation coupled solenoid movably positioned in a well bore and forming one arm of a bridge network which is connected to the surface of the earth means through a cable, which comprises a coil inductively coupled to said solenoid, two impedances connected to one terminal of said coil, a pair of normally open switches respectively connected to one terminal of each of said impedances, an electrical connection between the second terminal of said coil and both of said switches, a pair of relay coils for independently actuating said switches, a conductive path extending through said cable to the surface of the earth connected to one terminal of each of said relay coils, a source of potential connected to said conductive path and having a terminal positive and a terminal negative with respect to said path, a second conductive path extending through said cable into said well bore, a pair of oppositely poled rectifiers respectively connected between the second terminals of said coils and said second path, and means for selectively connecting said second path to said positive terminal and to said negative terminal for selective flow of current through said rectifiers and relay coils to close said switches and couple one or the other of said impedances to said solenoid.

10. Calibration means for logging systems having a formation coupled solenoid movably positioned in a well bore and forming one arm of a bridge network which is connected to the surface of the earth through a cable, which comprises a coil inductively coupled to said solenoid, a resistor and a condenser each connected to one terminal of said coil, a pair of normally open switches respectively connected to said resistor and to said condenser, an electrical connection between the second terminal of said coil and both of said switches, a pair of relay coils for independently actuating said switches, a conductive path extending through said cable to the surface of the earth connected to one terminal of each of said relay coils, a source of potential connected to said conductive path and having a terminal positive and a terminal negative with respect to said path, a second conductive path extending through said cable into said well bore, a pair of oppositely poled rectifiers respectively connected between said coils and said second path, and means for selectively connecting said second path to said positive terminal and to said negative terminal for selective flow of current through said rectifiers and said relay means to close said switches selectively to couple said resistor or condenser to said solenoid.

11. Calibration means for logging systems having a formation coupled solenoid movably positioned in a well bore and forming one arm of a bridge network which is connected to the surface of the earth through a cable, which comprises a coil wound around said solenoid, a resistor and a condenser connected to one terminal of said coil, a first normally open switch connected to said resistor, a second normally open switch connected to said condenser, an electrical connection between the second terminal of said coil and normally open contacts of said switches, a pair of relay coils for independently actuating said switches, conductor means extending through said cable to the surface of the earth connected to one terminal of each of said relay coils, a source of potential connected at its midpoint to said conductor means, a second conductor means extending through said cable into said well bore, a pair of oppositely poled rectifiers respectively connected between the second terminals of said coils and said second conductor means, and means for selectively connecting said second conductor means to the positive or negative terminal of said source of potential for flow of current through one or the other of said rectifiers to close said first or said second switch thereby to couple said resistor or said condenser to said solenoid.

12. In a system having a formation exploring element energized from an alternating current source and movably positioned in a well bore to produce a formation-dependent signal for application to the signal input circuits of each of a pair of phase-detecting networks, the combination which comprises a coil inductively coupled to said exploring element, a resistance and a condenser connected to said coil, a pair of normally open switches respectively connected to said resistor and to said condenser, an electrical connection between the second terminal of said coil and both of said switches, a pair of relay coils for independently actuating said switches, a conductor connected to a first terminal of both of said relay coils and extending to the surface of the earth, a source of potential connected at its midpoint to said conductor, a pair of oppositely poled rectifiers connected respectively to the second terminals of said relay coils, a second conductor connected to the point intermediate said rectifiers and extending to the surface of the earth, a selector at the surface of the earth having at least two circuit completing positions, a connection between a first terminal of said source and a first of said circuit completing positions for current flow through said selector and one of said rectifiers for closing one of said switches to couple said resistor to said formation exploring element to produce an added component to said formation-dependent signal equivalent to that produced by a first property of said formation, a connection between the second terminal of said source and the second of said completing positions for current flow through said selector and the second of said rectifiers to couple said condenser to said formation exploring element to produce an added component to said formation-dependent signal equivalent to that produced by a second independent property of said formation, means for applying a reference signal to one of said phase-detecting networks that is in-phase with said resistance-produced unbalance components, and means for applying a reference signal to the other of said phase-detecting networks that is in-phase with said condenser-produced unbalance component.

13. In a system having an exploring element energized from an alternating current source to produce a signal dependent upon the properties of the medium surrounding said element for application to a detecting network, the combination which comprises an impedance having a dominant characteristic equivalent to a selected property of said medium, circuit means operable remote from said element for coupling said impedance to said exploring element to produce an added component to said medium dependent signal identical in character with the component of said medium dependent signal produced by said selected property, and circuit means for transmitting from said source to said detecting network a reference voltage in phase-coincidence with said added signal component.

14. In a system having an exploring element energized from an alternating current source to produce a signal dependent upon properties of the medium surrounding said element for application to each of a pair of detecting networks, the combination which comprises a first impedance having a dominant characteristic equivalent to a first selected property of said medium and a second impedance having a dominant characteristic equivalent to an independent selected property of said medium, means operable remote from said element for coupling the first of said impedances to said exploring element to produce a first component of the same character as produced by said first selected property and for coupling to said exploring element said second impedance to said exploring element to produce a second component of the same character as produced by said independent selected property, and circuit means interconnecting said source and said pair of detecting networks for applying to the first of said networks a reference signal in phase-coincidence with said first component and for applying to the second of said networks a reference signal in phase-coincidence with the second of said components.

CARL W. ZIMMERMAN.

REFERENCES CITED

The following references are of record in the file of this patent:

UNITED STATES PATENTS

| Number | Name | Date |
|---|---|---|
| 1,812,392 | Zuschlag | June 30, 1931 |
| 2,535,666 | Broding | Dec. 26, 1950 |